(12) United States Patent
Grunitz

(10) Patent No.: US 6,203,747 B1
(45) Date of Patent: Mar. 20, 2001

(54) RESONATING INJECTION MOLDING MACHINE AND PROCESS FOR ITS OPERATION

(75) Inventor: Otto Grunitz, Wiehe (DE)

(73) Assignee: Mannesmann AG, Düseldorf (DE)

( * ) Notice: Subject to any disclaimer, the term of this patent is extended or adjusted under 35 U.S.C. 154(b) by 0 days.

(21) Appl. No.: 09/234,352

(22) Filed: Jan. 20, 1999

(30) Foreign Application Priority Data

Jan. 20, 1998 (DE) ............................................. 198 02 874

(51) Int. Cl.[7] .................................................. B29C 45/50
(52) U.S. Cl. ...................... 264/443; 264/69; 264/328.17; 264/349; 264/478; 366/78; 366/100; 425/174.2; 425/207; 425/587
(58) Field of Search ............................. 264/69, 443, 478, 264/328.17, 349; 366/78, 100; 425/174.2, 207, 208, 587

(56) References Cited

U.S. PATENT DOCUMENTS

| | | | |
|---|---|---|---|
| 4,994,220 | * | 2/1991 | Gutjahr et al. .......................... 264/69 |
| 5,017,311 | * | 5/1991 | Furusawa et al. .................... 264/443 |
| 5,160,466 | * | 11/1992 | Allan et al. ............................. 264/69 |
| 5,202,066 | * | 4/1993 | Furusawa et al. ...................... 264/69 |
| 5,435,712 | * | 7/1995 | Probst ................................... 264/443 |
| 5,885,495 | * | 3/1999 | Ibar ........................................ 264/69 |
| 5,951,928 | * | 9/1999 | Jinping ................................... 264/69 |

* cited by examiner

*Primary Examiner*—Jill L. Heitbrink
(74) *Attorney, Agent, or Firm*—Cohen, Pontani, Lieberman & Pavane

(57) ABSTRACT

An injection molding machine includes an injection molding cylinder with a material supply at one end and an injection nozzle at the other end and a material conveyance unit attached to a drive and movable in the injection molding cylinder. The injection molding machine also includes a vibration element for inducing a flow of melt within the injection molding cylinder for homogenizing the melt.

18 Claims, 4 Drawing Sheets

RESONATING INJECTION MOLDING MACHINE AND PROCESS FOR ITS OPERATION

BACKGROUND OF THE INVENTION

1. Field of the Invention

The invention relates to an injection molding machine having an injection molding cylinder with a funnel-shaped material supply at a foot end of the injection molding cylinder and an injection nozzle corresponding to a mold at a head of the injection molding cylinder and a material conveyance unit attached to a drive and movable at least in the interior of the injection molding cylinder. The invention also relates to a process for guiding a melt through such an injection molding cylinder.

2. Description of the Related Art

German reference DE-Gbm 91 06 039 discloses a gum massage brush with a handle, wherein the final, finished shape of the brush is attained by folding a known plastic along two folding axes by local softening, for example, by ultrasound. Thus, according to the aforementioned document, the finished part is treated by ultrasound, but the plastic mass in the injection molding machine is not.

Usually, a plastic melt is mixed in the injection molding cylinder by a screw. This type of apparatus for mixing the plastic melt requires relatively high mechanical driving power and causes wear to both the screw and the cylinder.

To sufficiently mix the plastic melt and to achieve certain homogeneities of the melt, length/diameter ratios of the screw greater than 20 are necessary. This requirement substantially lengthens the structural form of the injection unit in question. In addition, no influence can be exerted on the coefficient of friction of the melt as it passes through the gate boring.

One negative consequence of high coefficients of friction in the injection mass, which lead to an increase in the melt temperature during the injection process, is partial combustion phenomena.

SUMMARY OF THE INVENTION

The object of the invention is to create a process and a corresponding device using a simply constructed injection molding unit for controlling the injection resistance of the melt Furthermore, homogenization of different melt components is to be achieved without mechanical means.

The object is attained by an injection molding machine with an injection molding cylinder with a funnel shaped material supply at a foot end of the cylinder and an injection nozzle corresponding to a mold at the head end of the cylinder and a material conveyance unit attached to a drive and movable in the interior of the cylinder. The injection molding machine further includes a vibration element attached to a frequency generator for producing movement between the injection molding cylinder and the material conveyance unit. The frequency generator is adjustable in a frequency range in which the portion of the injection molding machine connected to the vibration element can be placed into resonance vibration.

The object is also attained by a process for guiding the melt introduced via a material supply through an injection molding cylinder and a material conveyance unit attached to a drive including the steps of exerting forces that excite the flow on the melt for producing a tranverse relative movement between the injection molding cylinder and the material conveyance unit using vibration bodies in the ultrasound range.

According to the invention, forces that excite the melt to flow are exerted on the melt in that a periodic relative movement. These forces for exerting periodic movement are generated at a frequency in the ultrasound range between the melt injection cylinder and the material conveyance unit of the injection molding machine. For this purpose, the device of the invention has vibration elements attached to either the injection molding cylinder or the material conveyance unit. The vibration elements are connected to a frequency generator, which is adjustable in a frequency range wherein the part of the injection molding machine connected to the vibration element is placed into an advantageously harmonic resonance vibration.

The vibration element may, for example, be a piezovibrator which may, for example, include quartz or barium titanate. The generated vibrations are disseminated along the injection molding cylinder or the material conveyance unit. The ratio of the length of the material conveyance unit, which is also referred to as the screw length, to the wave length of the ultrasound must be adjusted to resonance to attain the necessary vibration amplitude at the screw peak.

Moreover, the piezovibrator must be kept under prestress. In an advantageous embodiment, tension screws are used to hold flanges for clamping the piezovibrator between the flanges.

The vibration element may be connected to the injection molding cylinder. In this case, the injection molding cylinder, including its injection nozzle, must be disconnected from the mold with respect to vibration. A sliding seal or a damping element may be used as the disconnection element.

In another advantageous embodiment, the vibration element is arranged between the material conveyance unit and the drive. If the material conveyance unit is embodied as a screw, loop contacts must be provided, because the screw, in addition to moving transversely, rotates for mixing the melt. However, the material conveyance unit may also comprise a smooth-walled piston connected via a driving rod to the drive. The piston may be tubular and the vibration element may be arranged in the part inclined toward the injection nozzle.

Smooth-walled pistons may be used because, according to the invention, the degree of homogenization of the melt caused by the ultrasound vibrations permits the elimination of the mixing function of a screw. As a result, a substantially simpler piston injection unit is constructed while retaining the same homogenization effect as in screw plastification.

Thus, in the proposed solution, the properties of the ultrasound vibrations are used to achieve a strong mixing effect on inhomogeneous melts. At the boundary regions (homogeneity boundary), forces produced by the ultrasound vibrations occur that produce currents in the melt that mix the melt. It does not matter whether grain boundaries of non-molten granulates or color pigments are involved. Furthermore, the invention uses a second property of the ultrasound, namely, that of reducing the internal molecular friction of substances exposed to the ultrasound field. Depending on the extent to which the internal friction is reduced, the design according to the invention makes it possible to decrease the required injection power or to increase the injection speed while maintaining the same power. Especially at high injection speeds, the pressure loss via the injection nozzle represents the greatest part of the total injection power.

The third property of ultrasound used by the invention is the heating of the granulate. The release of heat is carried out mainly at the homogeneity boundary points where a need for melting still exists.

In summary, the advantages of the present invention over the prior art are as follows:

- the injection power may be reduced by reducing the internal molecular friction in the melt;
- the requirement of expensive and complicated plastifying screws is eliminated;
- the melt homogeneity is improved for problem materials;
- when piston injection units are used, the injection unit length may be shortened;
- the mixability of additives such as dyes and foreign components is improved;
- the wear on moving parts is reduced;
- the homogenization of the melt is improved, especially for optical applications.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
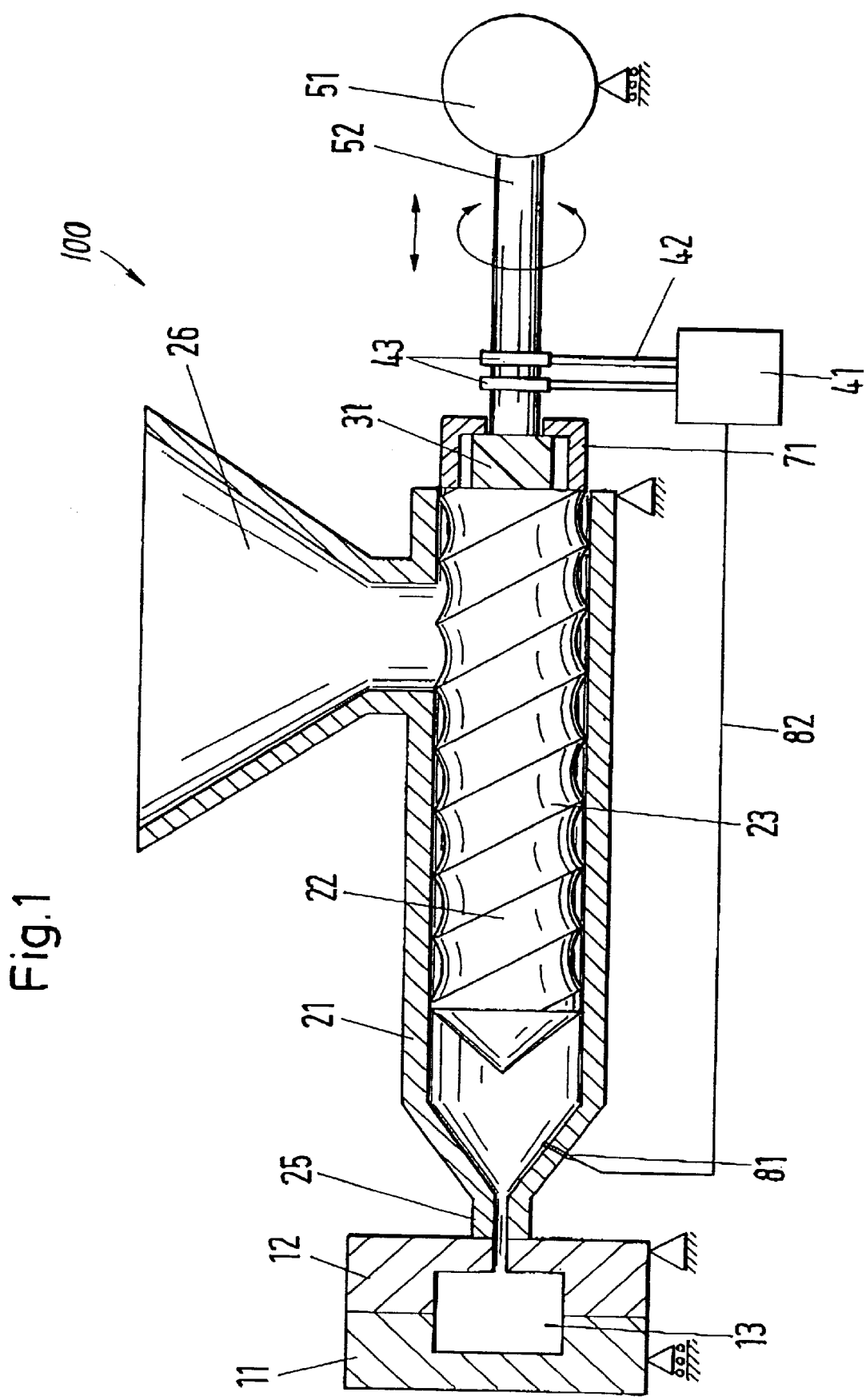
FIG. 1 shows an injection molding machine according to an embodiment of the invention with a screw and a vibration element between screw and a driving rod.

Referring to FIG. 1, an injection molding machine 100 according to an embodiment of the invention includes a movable mold part 11 and a fixed mold part 12 form a mold cavity 13. The fixed mold part 12 is connected to an injection nozzle 25 of an injection molding cylinder 21. A material supply 26 is mounted on the injection molding cylinder 21. A material conveyance unit 22 is arranged in the injection molding cylinder 21 and connected via a driving rod 52 to a drive 51. A thermal sensor 81 is mounted on the injection molding cylinder 21 and connected via a measurement line 82 to a frequency generator 41.

The material conveyance unit 22 is embodied as a screw 23 in FIG. 1. A housing 71 attached at the foot end of the material conveyance unit 22 encompasses a vibration element 31. The vibration element 31 is connected to the driving rod 52, which is attached to the drive 51. Loop contacts 43 on the driving rod 52 are corrected via a corniection 42 to the frequency generator 41.

The vibration element 31 is controlled by the frequency generator 41 for applying a force to the material conveyance unit 22 for generating a periodic relative movement between the material conveyance unit 22 and the injection molding cylinder 21. The vibration element 31 may, for example, comprise a piezovibrator. The frequency generator 41 may comprise an ultrasound generator operable in a frequency range of 10–40kHz.

Figure 2:
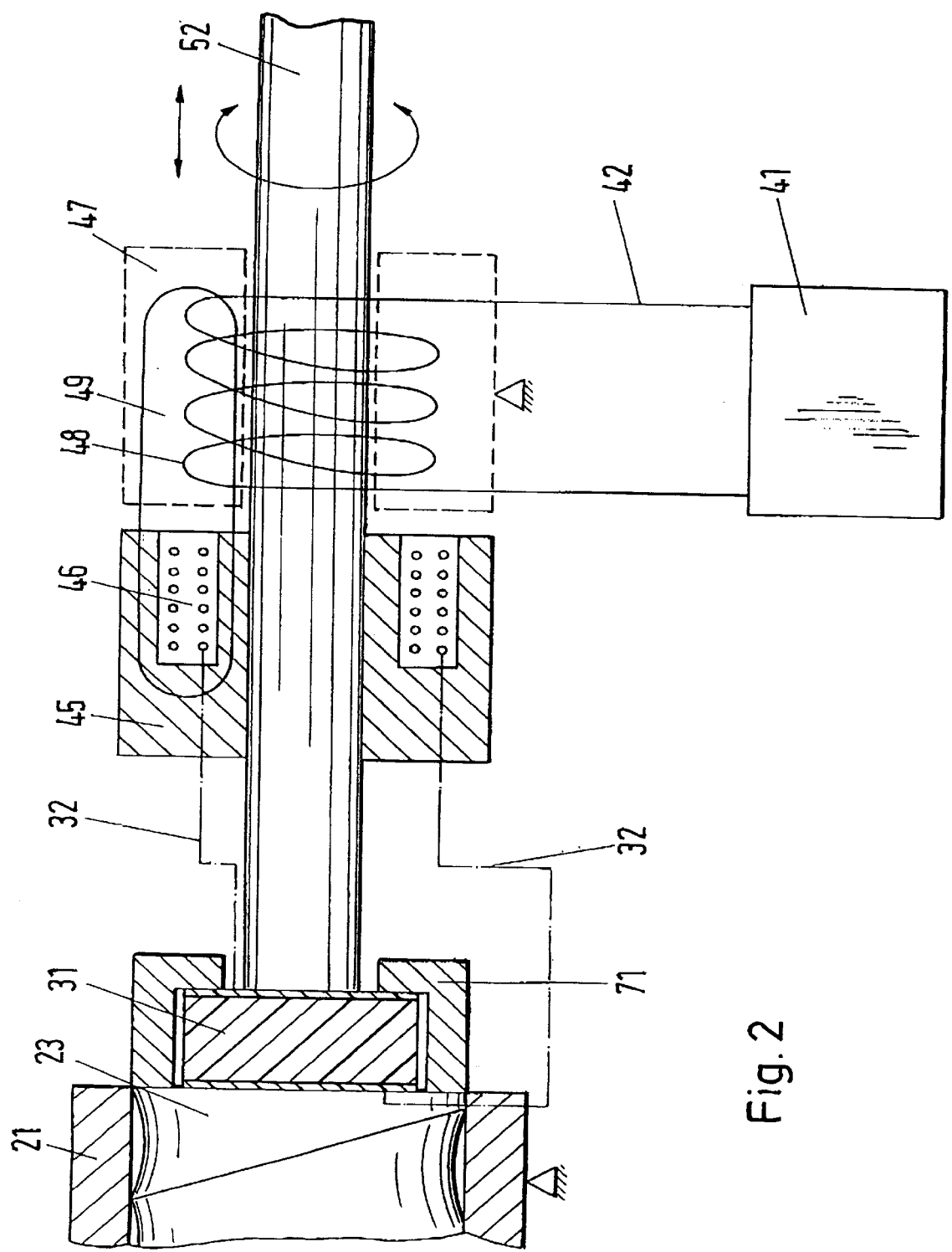
FIG. 2 shows an inductive coupling of a vibration element and the screw of FIG. 1.

FIG. 2 shows an inductive coupling of the connection between the frequency generator 41 and the vibration element 31 which may be used instead of the loop contacts 43. The frequency generator 41 is connected via connections 42 to a coil 48 arranged in an acoustic director 47. The acoustic director 47 encompasses the driving rod 52 connected to the drive 51 and is securely connected to the housing 71 of the screw 23. The coil 48 is connected magnetically via a coupling field 49 to a coil 46, which is arranged in an acoustic director 45 attached to the driving rod 52. The coil 46 is connected via connections 32 to the vibration element 31.

Figure 3:
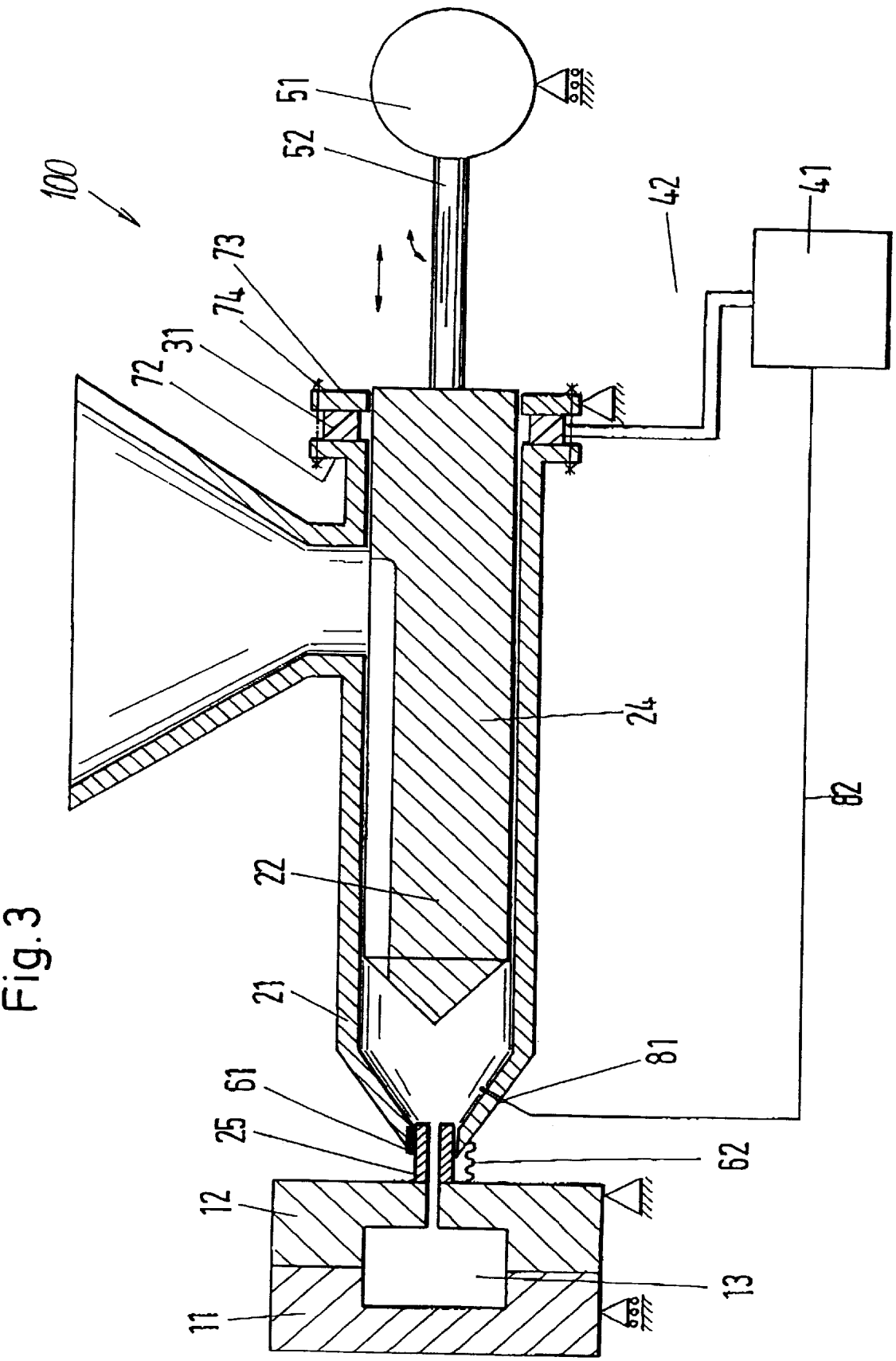
FIG. 3 shows an injection molding machine according to another embodiment of the invention with piston and a vibration element on an injection molding cylinder.

FIG. 3 shows a vibration element 31, which is directly connected to the injection molding cylinder 21. Arranged on the injection molding cylinder 21 are flanges 72 and 73 between which the vibration element 31 may be prestressed via screws 74. The prestress prevents intrinsic distortion of the vibration element 31 which may result from a change in the thickness during the vibration process. Furthermore, in FIG. 3, the material conveyance unit 22 is embodied as a piston 24, at the foot end of which is arranged the driving rod 52 connected to the drive 51. To provide a disconnection between the injection nozzle 25 and the fixed mold part 12, a sliding seal 61 or a damping element 62 may be used, thereby allowing the injection molding cylinder to vibrate independent from the fixed mold part 12.

Figure 4:
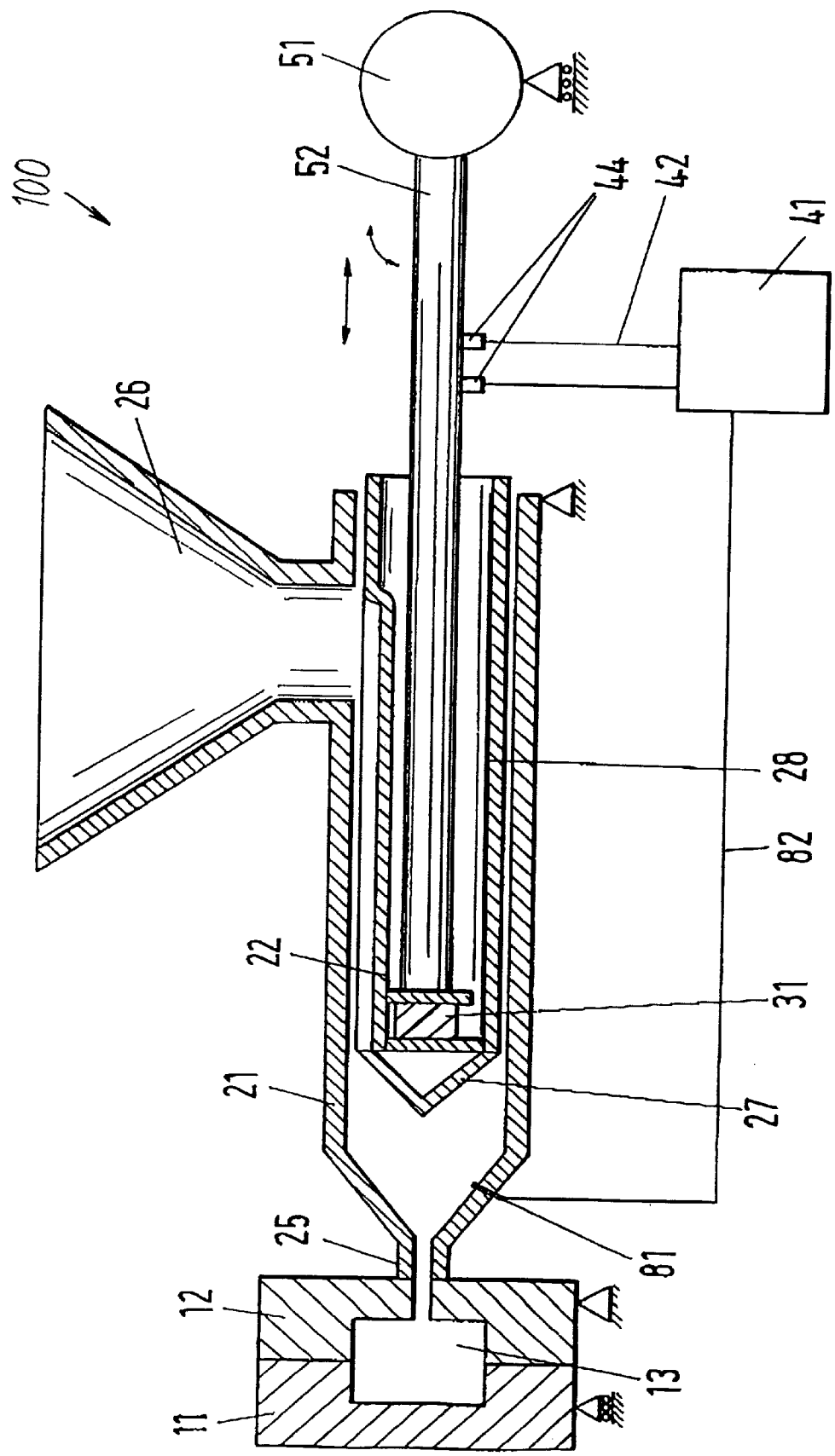
FIG. 4 shows an injection molding machine with hollow piston, and vibration element between piston and driving rod.

In FIG. 4, the material conveyance unit 22 is embodied as a tubular piston 28. A cover 27 is arranged at the top of the tubular piston 28 inclined toward the injection nozzle 25. The vibration element 31 is arranged proximate the cover 27 in the tubular piston 28 and is connected to the driving rod 52. Thus, in the present case, the driving rod 52 connected to the drive 51 extends deeply into the tubular piston 28.

In FIG. 4, contacts 44 on the driving rod 52 are connected via the connection 42 to the frequency generator 41. However, the rotary movement of the present driving rod 52 is limited to a small angle, so that the contacts 44 remain securely connected and no loop contacts, such as those shown in FIG. 1, are needed. Of course, it is also possible, as shown in FIG. 2, for the vibration energy to be transmitted to the injection molding machine using the principle of inductive transmission.

The invention is not limited by the embodiments described above which are presented as examples only but can be modified in various ways within the scope of protection defined by the appended patent claims.

I claim:

1. An injection molding machine for homogenizing a melt and injecting the melt into a mold, comprising:

an injection molding cylinder having a foot end and a head end with a funnel-shaped material supply at said foot end and an injection nozzle connectable with the mold at said head end;

a material conveyance unit attached to a drive and movable in the interior of the injection molding cylinder for urging the melt through said injection nozzle;

a vibration element connected to said injection molding cylinder for producing a relative movement between said injection molding cylinder and said material conveyance unit for generating a flow of the melt in said injection molding cylinder for homogenizing the melt;

a frequency generator operatively connected to said vibration element for adjusting a frequency of vibration of said vibration element such that said injection molding cylinder connected to said vibration element is movable in a resonance vibration; said injection molding cylinder being vibrationally decoupled from the mold while said injection nozzle is connected with the mold.

2. The injection molding machine of claim 1, wherein said vibration element is arranged between said material conveyance unit and said drive.

3. The injection molding machine of claim 1, wherein said injection nozzle is vibrational decoupled from the mold.

4. The injection molding machine of claim 1, further comprising a sliding seal arranged for effecting the decoupling of said injection molding cylinder from the mold.

5. The injection molding machine of claim 1, further comprising a damping element arranged between the mold and said injection molding cylinder for effecting the decoupling of said injection molding cylinder from the mold.

6. The injection molding machine of claim 2, further comprising a housing for encompassing an axial length of said vibration element.

7. The injection molding machine of claim 1, further comprising a housing for encompassing an axial length of said vibration element.

8. The injection molding machine of claim 2, wherein said injection molding cylinder comprises two flanges connected by tension screws and said vibration element is arranged between said two flanges, and said two screws are adjustable for exerting a prestressed force on said vibration element between said two flanges.

9. The injection molding machine of claim 1, wherein said injection molding cylinder comprises two flanges connected by tension screws and said vibration element is arranged between said two flanges, and said two screws are adjustable for exerting a prestressed force on said vibration element between said two flanges.

10. The injection molding machine of claim 2, wherein said vibration element comprises a piezovibrator.

11. The injection molding machine of claim 1, wherein said vibration element comprises a piezovibrator.

12. The injection molding machine of claim 1, wherein said material conveyance unit comprises a screw and said frequency generator comprises a loop contact at said connection between said vibration element and said frequency generator.

13. The injection molding machine of claim 1, further comprising a driving rod; and a first coil and acoustic director connected to said frequency generator and mounted about said driving rod;

a second coil and acoustic director magnetically coupled to said first coil and connected to said vibration element; and wherein said material conveyance unit comprises a screw.

14. The injection molding machine of claim 1, wherein said material conveyance unit comprises a piston connected via a driving rod to said drive.

15. The injection molding machine of claim 1, further comprising a thermal element operatively connected for ascertaining a temperature of said melt and outputting a signal in response to said temperature to said frequency generator.

16. The injection molding machine of claim 13, wherein said frequency generator comprises an ultrasound generator operable in a frequency range of 10–40 kHz.

17. A process for guiding a melt in an injection molding machine, comprising the steps of:

introducing a melt into an injection molding cylinder via a material supply between an injection nozzle of the injection molding cylinder and a material conveyance unit attached to a drive and movable within the injection molding cylinder;

operating a vibration element mounted on the injection molding cylinder at a frequency within an ultrasound range for exerting a transversal relative movement between the injection molding cylinder and the material conveyance unit for creating a force that excites the flow of the melt and homogenizes the melt in the injection molding cylinder;

vibrationally decoupling the injection cylinder from a mold: and while operating the material conveyance unit for urging the mixed melt into the mold.

18. The process of claim 1, further comprising the step of determining the speed and penetration depth of a flow of the melt perpendicular to the main axis of the injection molding machine by adjusting the amplitude and frequency of the transversal vibration of the injection molding machine in an area of the vibration element.

* * * * *